US012230262B2

(12) United States Patent
Mouline et al.

(10) Patent No.: US 12,230,262 B2
(45) Date of Patent: Feb. 18, 2025

(54) DETECTION AND CORRECTION OF PERFORMANCE ISSUES DURING ONLINE MEETINGS

(71) Applicant: Cisco Technology, Inc., San Jose, CA (US)

(72) Inventors: Ali Mouline, Cupertino, CA (US); Christopher Rowen, Santa Cruz, CA (US); David Guoqing Zhang, Fremont, CA (US); Francis Anthony Kurupacheril, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 319 days.

(21) Appl. No.: 17/504,726

(22) Filed: Oct. 19, 2021

(65) Prior Publication Data

US 2023/0117129 A1    Apr. 20, 2023

(51) Int. Cl.
*G10L 15/22*     (2006.01)
*G10L 15/08*     (2006.01)
*G10L 15/30*     (2013.01)
*H04L 65/401*    (2022.01)
*G06F 40/30*     (2020.01)
(Continued)

(52) U.S. Cl.
CPC .............. *G10L 15/22* (2013.01); *G10L 15/08* (2013.01); *G10L 15/30* (2013.01); *H04L 65/4015* (2013.01)

(58) Field of Classification Search
CPC ......... G10L 15/22; G10L 15/08; G10L 15/30; G10L 15/00; G06F 40/30; H04L 65/4015; H04L 65/80; H04L 65/403
See application file for complete search history.

(56) References Cited

U.S. PATENT DOCUMENTS 10,176,808 B1    1/2019  Lovitt et al.
10,264,214 B1    4/2019  Kumar
(Continued)

FOREIGN PATENT DOCUMENTS

CA    2993704 A1 *  8/2018  ....... G06F 16/90332
CN    109817243 A    5/2019

OTHER PUBLICATIONS

Elena Cipressi, et al., "An Effective Machine Learning (ML) Approach to Quality Assessment of Voice Over IP (VoIP) Calls," CISCO, IEEE Networking Letters, vol. 2, No. 2, Jun. 2020, 5 pages.
(Continued)

*Primary Examiner* — Daniel C Washburn
*Assistant Examiner* — Penny L Caudle
(74) *Attorney, Agent, or Firm* — Edell, Shapiro & Finnan, LLC

(57) ABSTRACT

Presented herein are techniques in which a device detecting a phrase spoken in an online collaboration session between a plurality of users, the phrase being spoken by a first user to one or more second users. The device determines that the phrase indicates an issue with a quality of user experience of the online collaboration session, labels a log of metrics associated with the online collaboration session with a time stamp corresponding to a time when the phrase was spoken, to provide a labeled log of metrics; and performs one or more actions to improve the user experience based on detecting the phrase.

20 Claims, 6 Drawing Sheets

(51) Int. Cl.
    *H04L 65/403*     (2022.01)
    *H04L 65/80*     (2022.01)

(56) References Cited

U.S. PATENT DOCUMENTS

| | | | |
|---|---|---|---|
| 11,128,484 B2 * | 9/2021 | Fahrendorff | G10L 15/22 |
| 11,605,384 B1 * | 3/2023 | Dalton | G10L 15/08 |
| 2014/0099004 A1 * | 4/2014 | DiBona | H04N 7/15 |
| | | | 345/158 |
| 2014/0214426 A1 | 7/2014 | Kanevsky et al. | |
| 2017/0337923 A1 * | 11/2017 | Komissarchik | G10L 15/22 |
| 2020/0092339 A1 | 3/2020 | Rakshit et al. | |
| 2021/0314238 A1 * | 10/2021 | Cioffi | H04L 41/5016 |

OTHER PUBLICATIONS

Alex Tsukernik, "It's Here! Monitor Microsoft Teams Audio Video Conferencing," Exoprise, https://www.exoprise.com/2021/09/15/monitor-microsoft-teams-audio-video-conferencing/, Sep. 15, 2021, 15 pages.

* cited by examiner

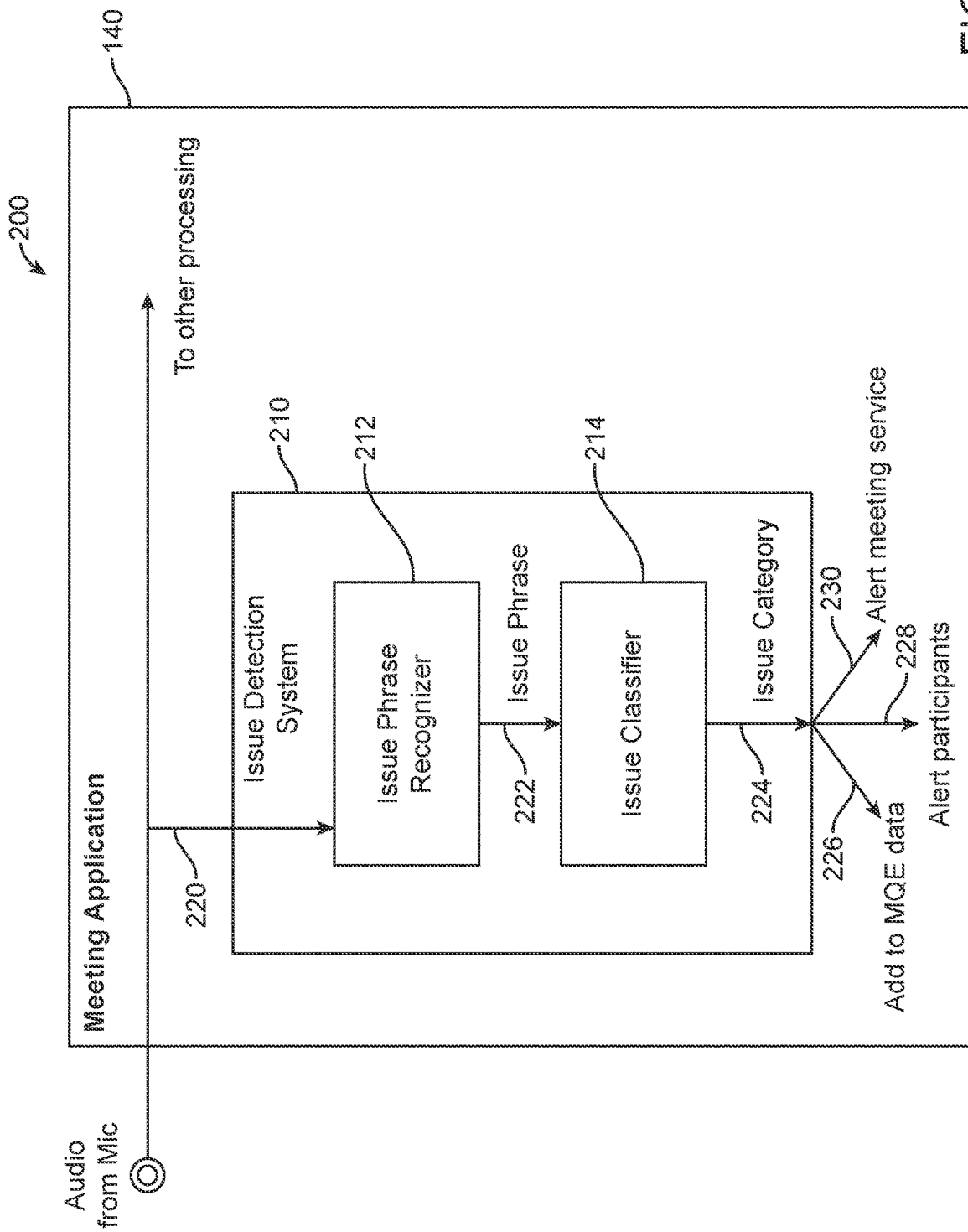

300

| Phrase | Classification | Attribute |
|---|---|---|
| 302 — I can't hear you | audio_no_audio | |
| 304 — I can't hear you, PARTICIPANT_NAME | audio_no_audio | PARTICIPANT_NAME |
| 306 — You are breaking up | audio_choppy | |
| 308 — PARTICIPANT_NAME, you are breaking up | audio_choppy | PARTICIPANT_NAME |
| 310 — You sound choppy | audio_choppy | |
| 312 — There is an echo | audio_echo | |
| 314 — PARTICIPANT_NAME, you are on mute | audio_muted | PARTICIPANT_NAME |
| 316 — PARTICIPANT_NAME, please mute | audio_do_mute | PARTICIPANT_NAME |
| 318 — PARTICIPANT_NAME, you sound too loud | audio_loud | PARTICIPANT_NAME |
| 320 — I can't/don't see you, PARTICIPANT_NAME | video_no_video | PARTICIPANT_NAME |
| 322 — PARTICIPANT_NAME, you are frozen | video_froze | PARTICIPANT_NAME |
| 324 — The video is DEFECT_DESCRIPTION | video_defect | DEFECT_DESCRIPTION |
| 326 — I can't see your screen | screen_not_visible | |

FIG. 3

DETECTION AND CORRECTION OF PERFORMANCE ISSUES DURING ONLINE MEETINGS

TECHNICAL FIELD

The present disclosure relates to detecting performance issues during online meetings based on participant speech and automatically correcting the performance issues.

BACKGROUND

Performance issues (e.g., audio stuttering, video freezing, etc.) may occur during online meeting or collaboration sessions, causing communication between participants to slow down or stop. In some cases, the affected participants and/or the meeting clients/servers may not be aware of the performance issues in real-time. Detecting the occurrence of the performance issues in real-time, alerting the participants of the issues, and triggering automatic corrective measures to address the performance issues in real-time may improve user and communication experiences. In addition, logging the timing and the nature of the performance issues may help debug and improve a meeting system in the future.

BRIEF DESCRIPTION OF THE DRAWINGS

FIG. 2 is a diagram depicting a method for identifying a performance issue in an online meeting based on a user verbalization and performing actions based on detecting the performance issue, according to an example embodiment.

FIG. 3 is a diagram depicting a table of phrases indicating performance issues in online meetings and categories associated with the phrases, according to an example embodiment.

DESCRIPTION OF EXAMPLE EMBODIMENTS

Overview

Presented herein are systems and methods for detecting a phrase spoken by a user in an online meeting or collaboration session that indicates an issue with a quality of user experience of the online collaboration session and performing actions to improve the user experience. The methods involve detecting a phrase spoken in an online collaboration session between a plurality of users, the phrase being spoken by a first user to one or more second users, and determining that the phrase indicates an issue with a quality of user experience of the online collaboration session. The methods further involve labeling a log of metrics associated with the online collaboration session with a time stamp corresponding to a time when the phrase was spoken to provide a labeled log of metrics, and performing one or more actions to improve the user experience based on detecting the phrase.

Example Embodiments

In an online meeting environment, participants and/or users (these terms are used interchangeably throughout the description) are participating via their respective devices that may be geographically remote from each other. The participant and the respective user (client) device, such as a computer, laptop, tablet, smart phone, video conference endpoint, etc., may collectively be referred to as endpoints, user devices, or devices. The devices may communicate with each other via one or more networks such as the Internet.

Some of the devices may have video capabilities in a communication session. Video capabilities may include, but are not limited to, live feed of a respective participant on a user interface screen. Other devices may not have video capabilities in the communication session and may only have audio capabilities. Further, some of the devices may have interactive connectivity to manipulate content on the user interface screen and other devices may have view-only capability to be able only to view content during the collaboration session. These are just some examples and are not provided by way of a limitation.

Figure 1:
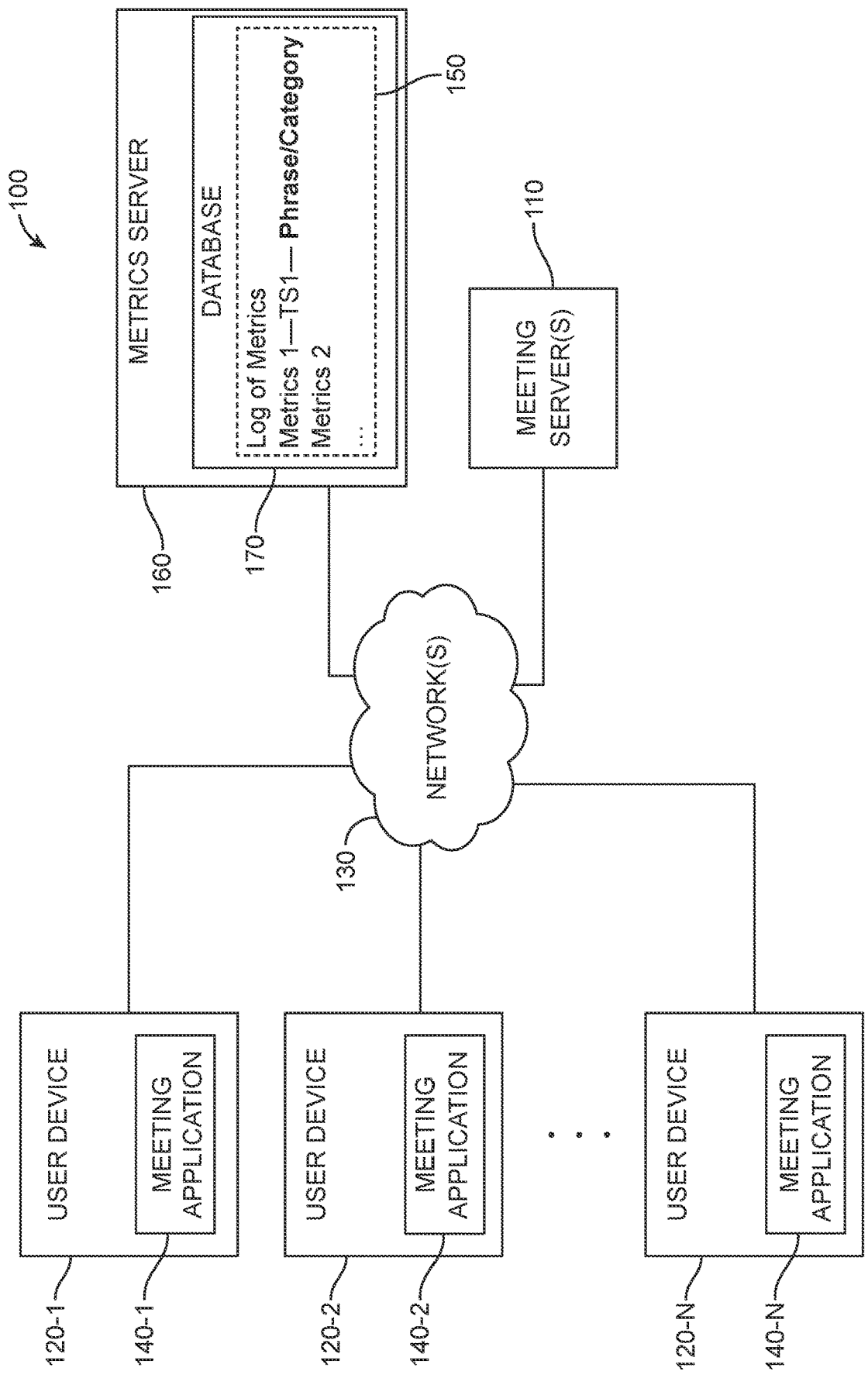
FIG. 1 is a block diagram of a system configured to provide a communication session among a plurality of participants and for which detection and correction of performance issues may be performed, according to an example embodiment.

Reference is first made to FIG. 1. FIG. 1 shows a block diagram of a system 100 that is configured to provide online meeting services that include services for detecting phrases spoken by participants that indicate performance issues and performing actions based on the detecting the phrases. The system 100 includes one or more meeting server(s) 110 and a plurality of user devices 120-1 to 120-N that communicate with meeting server(s) 110 via one or more networks 130. The meeting server(s) 110 are configured to provide an online meeting service for hosting a communication session among user devices 120-1 to 120-N. In some implementations, the meeting server(s) 110 are configured to perform corrective actions to improve a user experience when a performance issue with an online meeting is detected.

The user devices 120-1 to 120-N may be tablets, laptop computers, desktop computers, Smartphones, virtual desktop clients, video conference endpoints, or any user device now known or hereinafter developed that can run a meeting client, such as meeting applications 140-1 to 140-N, or similar communication functionality. The user devices 120-1 to 120-N may have a dedicated physical keyboard or touch-screen capabilities to provide a virtual on-screen keyboard to enter text. The network(s) 130 may include wired local and wide-area networks as well as wireless local and wide-area networks. The user devices 120-1 to 120-N may also have short-range wireless system connectivity (such as Bluetooth™ wireless system capability, ultrasound communication capability, etc.) to enable local wireless connectivity with a videoconference endpoint in a meeting room or with other user devices in the same meeting room.

Meeting applications 140-1 to 140-N may log or store data or metrics associated with an online meeting in a log of metrics 150. The log of metrics may be stored in a database 170 at a metrics server 160. For example, meeting applications 140-1 to 140-N may log numerous parameters per minute during an online communication session or meeting. The parameters may be associated with, for example, user devices 120-1 to 120-N, meeting applications 140-1 to 140-N, meeting server(s) 110, and/or other devices and/or elements associated with the online meeting (e.g., central processing unit (CPU) usage, CPU type, audio levels, packet loss, etc.). When an online meeting has concluded or when an online meeting is ongoing, meeting applications 140-1 to 140-N may add the information, data, and/or metrics in the log of metrics 150 to existing media quality event (MQE) data. For example, meeting applications 140-1 to 140-N may transmit the information, data, and/or metrics, to metrics server 160 (via network 130) to store in the log of metrics 150 at database 170. As discussed further with respect to FIG. 2, the MQE data may be sent to a remote reporting service and may be used to train machine learning devices to identify or predict imminent performance issues and perform actions with respect to the performance issues (e.g., log the performance issue, adjust parameters associated with online meetings to prevent issues from occurring, etc.).

Meeting applications 140-1 to 140-N may detect and classify issues that are naturally verbalized during online meetings. For example, meeting application 140 (any of meeting applications 140-1 to 140-N) may use Automatic Speech Recognition (ASR) capabilities using neural ASR techniques to detect phrases (such as "I can't hear you," "your audio is choppy," "your video froze," etc.) that indicate an issue with a quality of the online meeting. The phrases/utterances/verbalizations may be recognized during a meeting when a speaker is unmuted. An issue detection capability of meeting application 140 may not be active (i.e., meeting application 140 may not recognize or detect phrases) when the meeting application 140 is not in a meeting or when a user of the meeting application 140 is muted. The phrases that are identified as indicating quality issues with an online meeting are not user specific.

When a phrase that indicates an issue is detected, meeting application 140 may classify the phrase into one or more categories and label the log of metrics 150 with the phrase and/or the one or more categories, to provide a labeled log of metrics. In some embodiments, meeting application 140 may additionally label the log of metrics 150 with a time stamp indicating a time at which the phrase was spoken or uttered. As illustrated in FIG. 1, "Metrics 1" in the log of metrics 150 is labeled with TS1 (timestamp 1) and an indication of a phrase/category that was detected at that time. In this way, the log of metrics 150 may identify a time the phrase was spoken (TS1), a category of issue associated with phrase (Phrase/Category), and the metrics associated with the online meeting at a time when the phrase was spoken (Metrics 1).

When a phrase that indicated an issue is detected, meeting applications 140-1 to 140-N may additionally display a message to one or more users of user devices 120-1 to 120-N indicating the issue and possible actions the one or more users may perform to remedy the issue. For example, a user of user device 120-1 (e.g., Bob) may say to a user of user device 120-2 (e.g., Mary), "Mary, I can't hear you." In this example, meeting application 140-1 may determine volume levels associated with user device 120-1 and, if the volume levels are too low, meeting application 140-1 may display a message to a user (e.g., Bob) indicating that the volume should be increased (e.g., "Please increase your output volume"). Additionally or alternatively, meeting application 140-1 may send a message to meeting application 140-2 indicating the issue and meeting application 140-2 may display a message to a user (e.g., Mary) indicating actions to take to increase the input volume (e.g., "Please increase your input volume" or "You are currently on mute").

Meeting applications 140-1 to 140-N may additionally report the issue to meeting server(s) 110. Meeting server(s) 110 may take corrective measures based on the detected issue. For example, meeting server(s) 110 may adjust parameters associated with the meeting to resolve the issue detected during the meeting.

At a high level, the techniques presented herein involve detecting performance issues associated with an online meeting based on participant phrases and utterances. In addition, the techniques presented herein involve performing corrective actions in real-time to correct the detected issues. The techniques presented herein further involve labeling a log of metrics associated with the online meeting with information associated with the detected performance issue.

Reference is now made to FIG. 2, with continued reference to FIG. 1. FIG. 2 is a diagram depicting a method 200 for detecting performance issues in an online meeting based on participant utterances and performing actions based on the utterances, according to an example embodiment. The method 200 may be performed by one of the meeting applications 140-1 to 140-N of FIG. 1.

FIG. 2 depicts a meeting application 140 that includes an issue detection system 210 comprising an issue phrase recognizer 212 and an issue classifier 214. Meeting application 140 may receive audio from a microphone of user device (any of the user devices 120-1 to 120-N, not shown in FIG. 2) for processing. For example, a user of any user device may be participating in an online meeting or collaboration session and the audio from the microphone may be transmitted to meeting server(s) 110 (not shown in FIG. 2) and/or to other user devices for participating in the online meeting.

As shown in FIG. 2, at 220, issue detection system 210 may receive audio from the microphone. For example, a user may be speaking into the microphone attached to a user device during an online meeting and the issue detection system 210 may receive the audio from the microphone. The audio may be processed by the issue phrase recognizer 212. In one embodiment, the audio may be processed by the issue phrase recognizer 212 using ASR technology. If a key phrase indicating an issue is recognized by issue phrase recognizer 212, an issue event may be triggered and, at 222, the key phrase may be transmitted to issue classifier 214. Issue classifier 214 may receive the key phrase and, at 224, issue classifier 214 may classify the key phrase into one or more various categories. As further described below, the category or categories may be used to label the issue in the log the metrics 150 and/or take corrective actions to address the issue.

FIG. 3 illustrates a table 300 including phrases and corresponding classifications (or categories) and attributes. The phrases in table 300 correspond to exemplary key phrases that may be recognized by issue phrase recognizer 212 and may trigger an issue event. The phrases in table 300 are exemplary only and additional and/or different phrases may trigger an issue event.

The classifications in table 300 may correspond to categories of issues associated with a phrase. For example, entry 302 of table 300 indicates that the classification "audio_no_audio" corresponds to the phrase "I can't hear you." Issue classifier 214 may classify the key phrase into one or more categories based on the classifications in table 300. In one embodiment, the categories or classification may be used to label the log of metrics 150 when the key phrase is detected. In another embodiment, the categories may be used to determine which actions to take to address the issue.

The attributes in table 300 may correspond to additional information included in the phrase uttered by a participant. An attribute may correspond to, for example, a participant addressed in the phrase or a defect description associated with the phrase. As shown at entry 304 in table 300, in one example, the phrase "I can't hear you, PARTICIPANT_NAME" may have the classification "audio_no_audio" and the attribute "PARTICIPANT_NAME." When the attribute is a participant's name, the attribute may be used by meeting application 140 to transmit the phrase or category to a meeting application 140 associated with the participant addressed in the phrase. As another example, entry 324 in table 300 indicates that the phrase "The video is DEFECT_DESCRIPTION" corresponds to the classification "video_defect" and the attribute "DEFECT_DESCRIPTION."

As further shown in table 300, at entry 306, the phrase "You are breaking up" corresponds to the classification "audio_choppy." At entry 308, the phrase "PARTICIPANT_NAME, you are breaking up" corresponds to the classification "audio_choppy" and the attribute "PARTICIPANT_NAME." At entry 310, the phrase "You sound choppy" corresponds to the classification "audio_choppy." At entry 312, the phrase "There is an echo" corresponds to the classification "audio_echo." At entry 314, the phrase "PARTICIPANT_NAME, you are on mute" corresponds to the classification "audio_muted" and the attribute "PARTICIPANT_NAME." At entry 316, the phrase "PARTICIPANT_NAME, please mute" corresponds to the classification "audio do mute" and the attribute "PARTICIPANT_NAME." At entry 318, the phrase "PARTICIPANT_NAME, you sound too loud" corresponds to the classification "audio_loud" and the attribute "PARTICIPANT_NAME." At entry 320, the phrase "I can't/don't see you, PARTICIPANT_NAME" corresponds to the classification video_no_video and the attribute "PARTICIPANT_NAME." At entry 322, the phrase "PARTICIPANT_NAME, you are frozen" corresponds to the classification "video_froze" and the attribute "PARTICIPANT_NAME." At entry 326, the phrase "I can't see your screen" corresponds to the classification "screen_not_visible."

Returning to FIG. 2, at 226, the issue category and time stamp may be added to existing MQE data that is reported to a remote reporting service. As discussed above, meeting application 140 may log metrics/data/parameters associated with online meetings in the log of metrics 150. In one implementation, the phrase and/or the category associated with the phrase may be added to the log of metrics 150 to label the corresponding metrics/data/parameters at the time the phrase was uttered. In addition, a time stamp indicating the time the phrase was uttered may be used to label the log of metrics 150. The MQE data may be reported to a remote reporting service for analysis.

Based on the updated MQE data, the logs that correspond to the degraded user experience and the corresponding set of internal meeting system metrics and quality of service QoS/network metrics may be identified. For example, based on a manual inspection, the metrics/parameters/data corresponding to a time when the phrase was uttered may be identified. In addition, QoS alerts may be triggered based on real user experience. For example, an alert may be triggered when parameters similar to parameters that caused a degraded experience are detected. Because the log of metrics 150 indicates the time when a phrase indicating a degraded experience is uttered, it may be possible to identify the parameters of the devices in the meeting system when the quality issue was detected by a participant.

In addition, over time and with accumulated MQE data, a machine learning system (e.g., an MQE issue detector) may be trained to learn the correlation of a set of metric values to a specific degradation. Put another way, the user verbalized issues may be used to automatically label the sets of MQE records for the machine learning classification training process. In this way, the MQE issue detection system may be able to identify (or predict imminent) degraded user experiences without the user verbalizations. For example, the MQE issue detection system could learn to detect issues when a particular combination of a meeting application version, operating system version, and CPU version are used.

Once the MQE issue detection system is trained and is able to detect issues, users (e.g., engineers) may prescribe specific corrective actions suitable for each degradation type and relevant conditions. This assures the right corrective actions are taken because the corrective actions are determined for each set of conditions. When the rules for the corrective actions are set, the system can automatically apply the corrective action or actions when issues are detected without requiring any participant verbalizations.

In one implementation, based on the machine learning classification training process, the MQE issue detection system may be able to identify that a performance issue has occurred based on parameters associated with an online meeting, without a user uttering a phrase or verbalization, and MQE issue detection system may log the performance issue. In another implementation, based on the machine learning classification training process, the MQE issue detection system may predict that a performance issue is likely to occur based on parameters associated with an online meeting and the system may take actions to prevent the performance issue from occurring (e.g., adjusting parameters associated with the online meeting).

Still referring to FIG. 2, at 228, one or more participants of the online meeting may be alerted to the issue by displaying the issue and/or actions for correcting the issue using a user-friendly message via the appropriate participant's meeting application 140. Meeting application 140 may provide actionable hints to users based on the phrase that was uttered (or category of the phrase) so that a user may take actions to correct the issue. Because the actions are dependent on the utterance, corrective actions may be provided to the correct participant to address the issue.

When meeting application 140 detects a specific utterance, for example, "I can't hear you," the meeting application 140 may provide actionable hints to the user to correct the issue and/or the meeting application 140 may alert another meeting application 140 of the issue and the other meeting application 140 may provide actionable hints to a different user. For example, if the user of user device 120-1 says "I can't hear you" to a user of user device 120-2, meeting application 140-1 may check the speaker volume setting of user device 120-1. If meeting application 140-1 determines that the speaking volume setting is too low, meeting application 140-1 may display an appropriate message to the user, such as "Please increase your output volume."

Meeting application 140-1 may additionally transmit a message to meeting application 140-2 indicating the issue. In one implementation, meeting application 140-1 may transmit the message to meeting application 140-2 automatically upon detecting the utterance or identifying the issue. In another implementation, meeting application 140-1 may transmit the message after determining that the speaker volume of user device 120-1 is appropriate and therefore the issue may be corrected by the user of user device 120-2. When meeting application 140-2 receives the message, meeting application 140-2 may check the microphone volume setting of user device 120-2 and, if the volume setting is too low or muted, meeting application 140-2 may display an appropriate message, such as "Please increase your input volume" or "You are currently on mute." If meeting application 140-2 determines that the microphone input level is appropriate, meeting application 140-2 may display a message such as "Is your headset boom set right?"

At 230 in FIG. 2, the issue may be reported to meeting server(s) 110 and meeting server(s) 110 may initiate corrective measures based on the issue type/category. During a meeting, immediate corrective actions may be taken by meeting application 140 and/or meeting server(s) 110 to improve the meeting experience. In one implementation, the corrective actions may be taken by meeting application 140, meeting server(s) 110, or both based on a category associated with the issue.

For example, in a situation where a user of user device 120-1 says "You sound choppy" to a user of user device 120-2, the issue detection system 210 of meeting application 140-1 may recognize the phrase as a key phrase (e.g., from table 300) and report the issue or category of the issue to meeting server(s) 110. Meeting server(s) 110 may report the issue or category to meeting application 140-2 (which may be identified by the order of audio channels if the user of user device 120-1 does not address the user by name) and meeting application 140-2 may take corrective actions (e.g., reducing the audio bit-rate, changing codex, reducing video resolution, etc.).

As another example, in a situation where a user of user device 120-1 says "You sound too loud," the issue detection system 210 of meeting application 140-1 may take corrective actions, such as reducing the automatic gain control (AGC) gain.

In situations where multiple participants say "Your video froze," "I can't see you," or "Your video is flaky," the issue detection systems 210 of the participants' meeting applications 140 may recognize that an issue has occurred based on the phrases and may report the issue or the category of the issue to meeting server(s) 110. Meeting server(s) 110 may recognize that a general issue for the meeting has occurred and may take corrective action at the meeting level (such as automatically adding more video servers to support the meeting).

In another example, during virtual private network (VPN) sessions, in a situation where multiple participants say "Your video froze," "I can't see you," or "Your video is flaky," the issue detection systems 210 of the participants' meeting applications 140 may recognize that an issue has occurred based on the phrases and may report the issue or the category of the issue to meeting server(s) 110. Meeting server(s) 110 may recognize that a general issue for the meeting on a VPN has occurred and may take corrective action (such as requesting more VPN bandwidth during the meeting).

When a meeting application 140 is not active and based on specific patterns learned by the machine learning system, meeting application 140 may be updated by installing specific patches or settings. For example, if the detection of a particular combination of meeting application version, operating system version, and CPU version causes participants to say "You sound choppy," a patch or an update may be installed on meeting application 140 that fit the particular combination of meeting application version, operating system version, and CPU version.

The examples described with respect to FIG. 2 significantly enhance user experience by providing real-time corrective actions to address issues based on participants' utterances. By identifying issues as they occur (i.e., based on users' phrases and utterances) and performing actions that are identified based on the type of issue, performance issues may be addressed as the occur. In addition, by logging the occurrences of the phrases/utterances with the metrics/data/parameters associated with the online meeting, potential issues may be addressed before a degradation in the user experience occurs.

Figure 4:
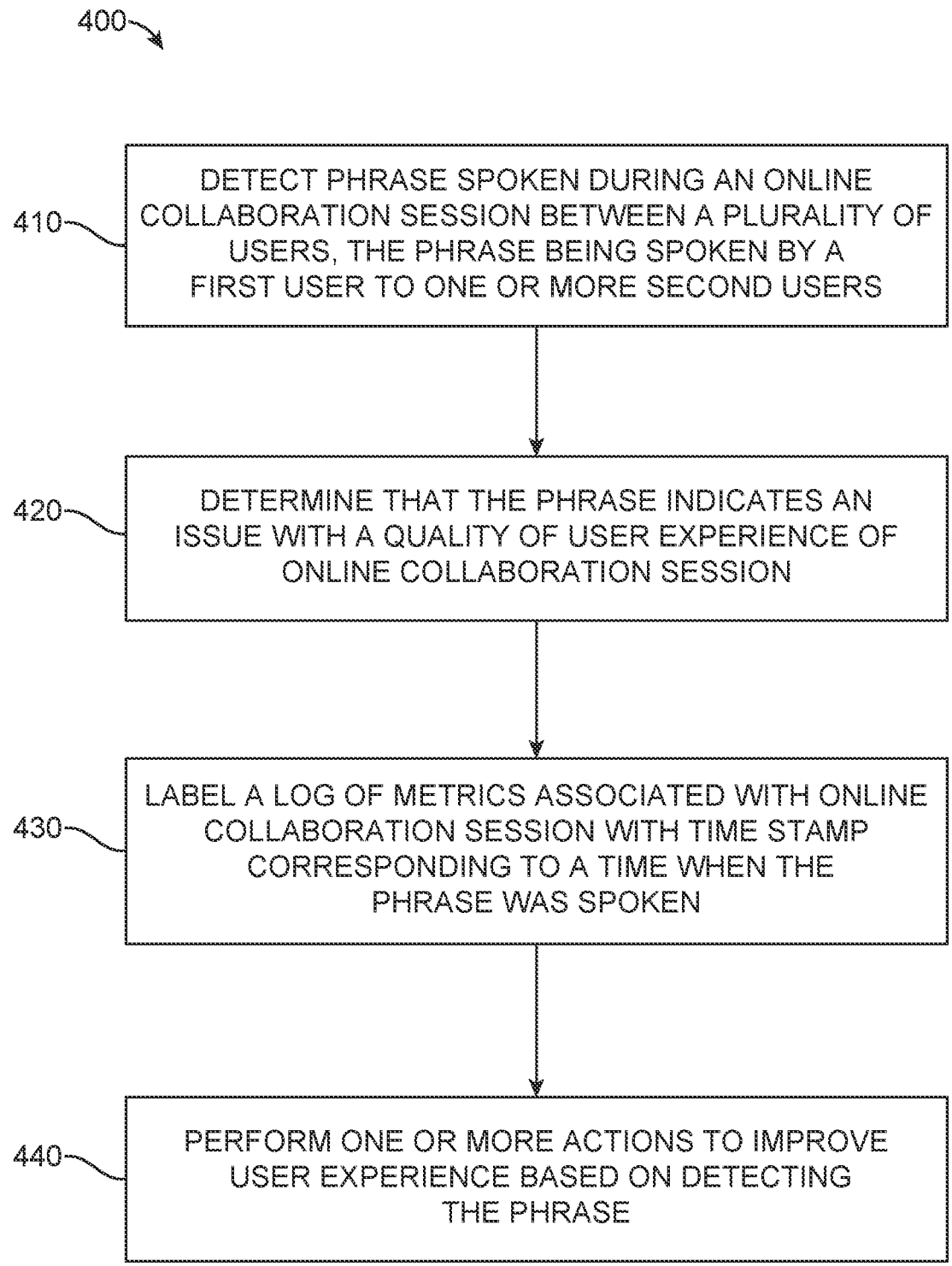
FIG. 4 is a flowchart illustrating a method for identifying a performance issue in an online meeting based on a user verbalization and performing actions based on detecting the performance issue, according to an example embodiment.

Referring to FIG. 4, FIG. 4 is a flow diagram illustrating a method 400 of detecting a phrase in an online meeting that indicates an issue with a quality of user experience of the online meeting and performing actions to improve the user experience based on detecting the phrase. The method 400 may be implemented by a meeting application 140 of FIG. 1 and/or the meeting server(s) 110 of FIG. 1. For example, one of the meeting server(s) 110 may implement part of the method 400 based on information received from one of the meeting applications 140.

At 410, the method 400 involves detecting a phrase spoken by a user during an online collaboration session. For example, a user may be participating in an online meeting or collaboration session using user device 120 and meeting application 140 or issue detection system 210 may detect a phrase spoken by the user. In one implementation, the phrase may be spoken by the user to another user or participant of the online collaboration system. In another implementation, the phrase may be spoken by the user to the user. At 420, the method 400 involves determining that the phrase indicates an issue with a quality of user experience of the online meeting. For example, issue phrase recognizer 212 may determine that the phrase indicates a performance issue with the online meeting. In one implementation, the phrase may be a phrase from a list of phrases (such as the list of phrases in table 300) that indicate performance issues.

At 430, the method 400 involves labeling a log of metrics associated with the online meeting with a time stamp corresponding to a time when the phrase was spoken to provide a labeled log of metrics. In one implementation, issue classifier 214 may classify the issue into one or more categories of issues and may label a log of metrics (e.g., log of metrics 150) with the phrase or the category of issue and the time stamp indicating the time when the phrase was spoken. In this way, the labeled log of metrics may indicate a time the phrase was spoken, a category of performance issue associated with the phrase, and metric/data/parameters associated with the online collaboration session at a time the phrase was spoken.

At 440, the method 400 involves performing one or more actions to improve the user experience based on detecting the phrase. In one implementation, the one or more actions may include reporting the labeled log of metrics to a remote reporting service for analysis. As discussed above, the labeled log of metrics may be used as a tool to train a machine learning system to detect and/or correct performance issues in subsequent online meetings based on the metrics/data/parameters associated with the online meeting at a time the performance issue occurred and the phrase was spoken by the user.

In another implementation, the one or more actions may include displaying corrective actions to be taken on a display of one of the plurality of users. For example, meeting application 140 may determine that the performance issue may be corrected based on a user action (e.g., increasing the output volume of a user device 120, unmuting user device 120, etc.) and meeting application 140 may display a message to a user with an action the user may perform to remedy the performance issue. In one implementation, meeting application 140 may transmit a message to another meeting application 140 with information associated with the issue and the other meeting application 140 may display an actionable hint to a user to correct the issue. The corrective actions may be based on a category or classification associated with the phrase spoken by the user.

In another implementation, the one or more actions may include adjusting parameters associated with the online meeting or collaboration session. In one implementation, meeting application 140 may take actions (e.g., reduce the audio bitrate, change codec, reduce video resolution, reduce the AGC gain, etc.) to correct the performance issue. In another implementation, meeting application 140 may report the performance issue to meeting server(s) 110 and meeting server(s) 110 may take actions (e.g., add more video servers to support the meeting, request more VPN bandwidth during the meeting, etc.) to correct the performance issue. In another implementation, meeting application 140 and meeting server(s) 110 may both take actions and/or adjust parameters to correct the performance issue. The actions taken and/or the parameters adjusted may be based on the category/classification associated with the phrase spoken by the user.

The examples described with respect to FIG. 4 provide real-time corrective actions for addressing performance issues identified based on phrases spoken by one or more participants of an online collaboration session. The techniques described herein may provide an increased quality of experience for users participating in an online collaboration session.

Figure 5:
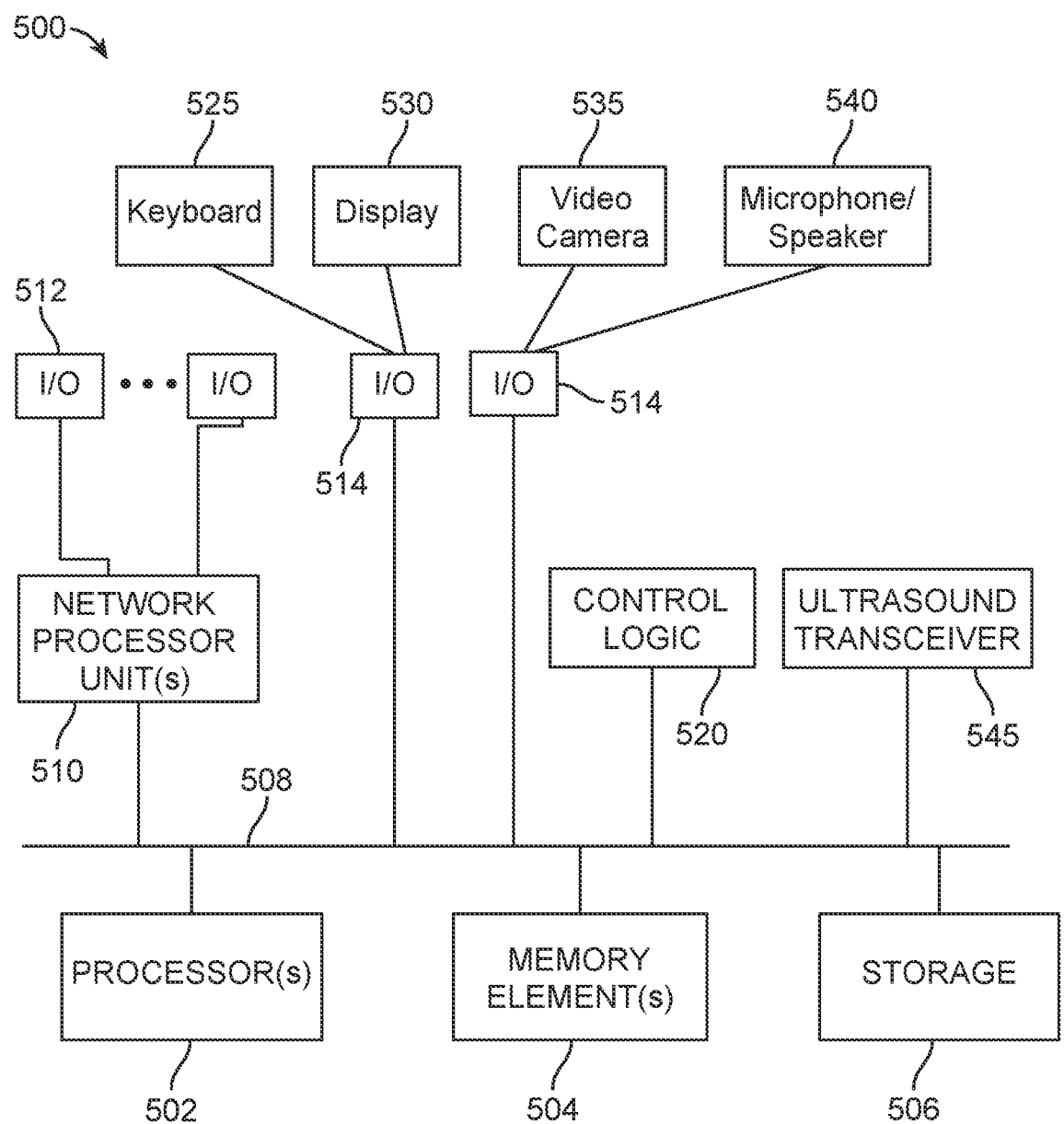
FIG. 5 is a hardware block diagram of a computer device that may be configured to perform the user device based operations involved in establishing location-based breakout sessions, according to an example embodiment.

Referring to FIG. 5, FIG. 5 illustrates a hardware block diagram of a computing/computer device 500 that may perform functions of a user device associated with operations discussed herein in connection with the techniques depicted in FIGS. 1-4. In various embodiments, a computing device, such as computing device 500 or any combination of computing devices 500, may be configured as any devices as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard 525, keypad, a touch screen, and/or any other suitable input and/or output device now known or hereafter developed. This may be the case, in particular, when the computer device 500 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 530 shown in FIG. 5, particularly when the computer device 500 serves as a user device as described herein. Display 530 may have touch-screen display capabilities. Additional external devices may include a video camera 535 and microphone/speaker combination 540. In addition, the computing device 500 may further include an ultrasound transceiver 545 that may be used for the various purposes described herein. While FIG. 5 shows the display 530, video camera 535 and microphone/speaker combination 540 as being coupled via an I/O interfaces 514, it is to be understood that these components may instead be coupled to the bus 508.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 6:
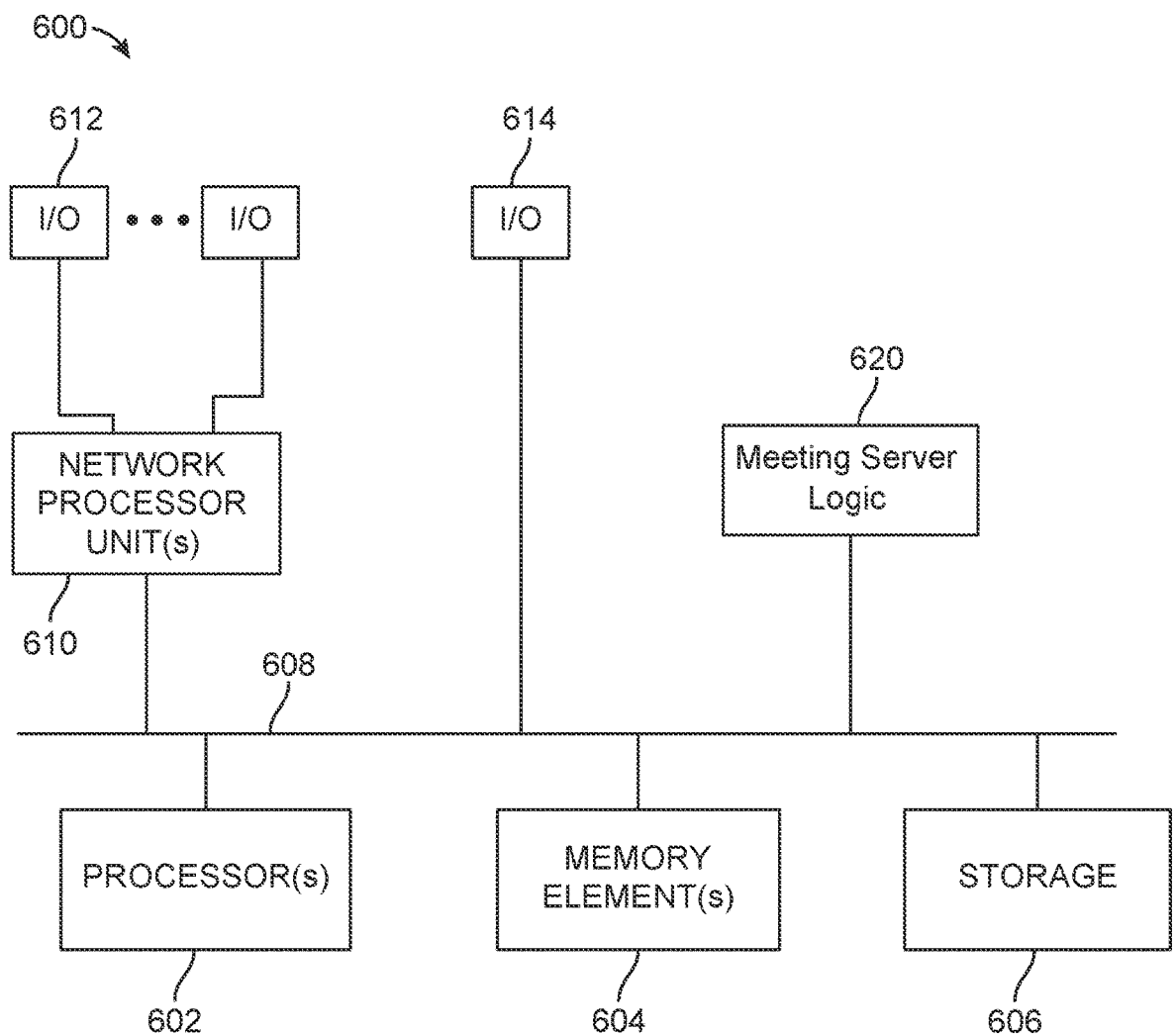
FIG. 6 is a hardware diagram of a computer device that may be configured to perform the meeting server operations involved in establishing location-based breakout sessions, according to an example embodiment.

FIG. 6 illustrates a block diagram of a computing device 600 that may perform the functions of the meeting server(s) 110 described herein. The computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and meeting server logic 620. In various embodiments, instructions associated with the meeting server logic 620 is configured to perform the meeting server operations described herein, including those depicted by the flow chart for method 400 shown in FIG. 4.

In one form, a computer-implemented method is provided comprising detecting a phrase spoken in an online collaboration session between a plurality of users, the phrase being spoken by a first user to one or more second users; determining that the phrase indicates an issue with a quality of user experience of the online collaboration session; labeling a log of metrics associated with the online collaboration session with a time stamp corresponding to a time when the phrase was spoken, to provide a labeled log of metrics; and performing one or more actions to improve the user experience based on detecting the phrase.

In one example, the method may include displaying corrective actions to be taken on a display of one of the plurality of users. In another example, the method may include adjusting, at a client of one of the plurality of users, parameters associated with the online collaboration session. In another example, the method may include transmitting, by a client of one of the plurality of users, a message to a server supporting the online collaboration session, the message including information associated with the issue.

In another example, the method may include determining a category of issue associated with the phrase, and labeling the log may include labeling the log with the category of issue and/or the phrase. In another example, the method may include estimating that a second issue in a second online collaboration session has occurred without being verbalized, based on parameters associated with the second online collaboration session and information associated with the labeled log of metrics; and logging the estimated second issue. In another example, the method may include predicting a second issue in a second online collaboration session based on parameters associated with the second online collaboration session and information associated with the labeled log of metrics; and applying corrective actions to prevent the second issue from occurring.

In another form, an apparatus is provided comprising a memory; a network interface configured to enable network communications; and a processor, wherein the processor is configured to perform operations comprising: detecting a phrase spoken in an online collaboration session between a plurality of users, the phrase being spoken by a first user to one or more second users; determining that the phrase indicates an issue with a quality of user experience of the online collaboration session; labeling a log of metrics associated with the online collaboration session with a time stamp corresponding to a time when the phrase was spoken, to provide a labeled log of metrics; and performing one or more actions to improve the user experience based on detecting the phrase.

In still another form, one or more non-transitory computer readable storage media encoded with instructions are provided that, when executed by a processor, cause the processor to execute a method comprising: detecting a phrase spoken in an online collaboration session between a plurality of users, the phrase being spoken by a first user to one or more second users; determining that the phrase indicates an issue with a quality of user experience of the online collaboration session; labeling a log of metrics associated with the online collaboration session with a time stamp corresponding to a time when the phrase was spoken, to provide a labeled log of metrics; and performing one or more actions to improve the user experience based on detecting the phrase.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   detecting a phrase spoken in an online collaboration session between a plurality of users, the phrase being spoken by a first user to one or more second users, the phrase including a name of a user of the one or more second users;
   determining that the phrase indicates an issue with a quality of user experience of the online collaboration session;
   identifying, from a list that includes phrases, corresponding categories of issues, and corresponding attributes, a category of the issue associated with the phrase and an attribute associated with the phrase, the attribute indicating that the name of the user is included in the phrase;
   labeling a log of metrics associated with the online collaboration session with a time stamp corresponding to a time when the phrase was spoken and at least one of an indication of the phrase that was spoken or the category of the issue associated with the phrase that was spoken, to provide a labeled log of metrics that indicates a set of metric values associated with the online collaboration session at the time when the phrase was spoken;
   determining one or more actions to perform based on the category of the issue associated with the phrase and the name of the user;
   performing the one or more actions to improve the user experience based on detecting the phrase, the one or more actions including transmitting the phrase or the category of the issue to an online collaboration session application associated with the user; and
   training a machine learning system using the labeled log of metrics to identify or predict degraded user experiences associated with subsequent online collaboration sessions.

2. The computer-implemented method of claim 1, wherein detecting the phrase comprises detecting the phrase using automatic speech recognition (ASR).

3. The computer-implemented method of claim 1, wherein performing the one or more actions further comprises:
   displaying corrective actions to be taken on a display of one of the plurality of users.

4. The computer-implemented method of claim 1, wherein performing the one or more actions further comprises:
   adjusting, at a client of one of the plurality of users, parameters associated with the online collaboration session.

5. The computer-implemented method of claim 1, wherein performing the one or more actions further comprises:
   transmitting, by a client of one of the plurality of users, a message to a server supporting the online collaboration session, the message including information associated with the issue.

6. The computer-implemented method of claim 1, wherein labeling the log comprises labeling the log with the category of the issue.

7. The computer-implemented method of claim 1, further comprising:
   estimating that a second issue in a second online collaboration session has occurred without being verbalized, based on parameters associated with the second online collaboration session and information associated with the labeled log of metrics; and
   logging the second issue.

8. The computer-implemented method of claim 1, further comprising:
   predicting a second issue in a second online collaboration session based on parameters associated with the second online collaboration session and information associated with the labeled log of metrics; and
   applying corrective actions to prevent the second issue from occurring.

9. An apparatus comprising:
   a memory;
   a network interface configured to enable network communication; and
   a processor, wherein the processor is configured to perform operations comprising:
      detecting a phrase spoken in an online collaboration session between a plurality of users, the phrase being spoken by a first user to one or more second users, the phrase including a name of a user of the one or more second users;
      determining that the phrase indicates an issue with a quality of user experience of the online collaboration session;
      identifying, from a list that includes phrases, corresponding categories of issues, and corresponding attributes, a category of the issue associated with the phrase and an attribute associated with the phrase, the attribute indicating that the name of the user is included in the phrase;
      labeling a log of metrics associated with the online collaboration session with a time stamp corresponding to a time when the phrase was spoken and at least one of an indication of the phrase that was spoken or the category of the issue associated with the phrase that was spoken, to provide a labeled log of metrics that indicates a set of metric values associated with the online collaboration session at the time when the phrase was spoken;

determining one or more actions to perform based on the category of the issue associated with the phrase and the name of the user;

performing the one or more actions to improve the user experience based on detecting the phrase, the one or more actions including transmitting the phrase or the category of the issue to an online collaboration session application associated with the user; and training a machine learning system using the labeled log of metrics to identify or predict degraded user experiences associated with subsequent online collaboration sessions.

10. The apparatus of claim 9, wherein the processor is configured to perform the detecting the phrase by:

detecting the phrase using automatic speech recognition (ASR).

11. The apparatus of claim 9, wherein the processor is further configured to perform the one or more actions by:

displaying corrective actions to be taken on a display of one of the plurality of users.

12. The apparatus of claim 9, wherein the processor is further configured to perform the one or more actions by:

adjusting parameters associated with the online collaboration session.

13. The apparatus of claim 9, wherein the processor is further configured to perform the one or more actions by:

transmitting, by a client of one of the plurality of users, a message to a server supporting the online collaboration session, the message including information associated with the issue.

14. The apparatus of claim 9, wherein the processor is further configured to perform labeling the log by:

labeling the log with the category of the issue.

15. The apparatus of claim 9, wherein the processor is further configured to perform operations comprising:

estimating that a second issue in a second online collaboration session has occurred without being verbalized, based on parameters associated with the second online collaboration session and information associated with the labeled log of metrics; and logging the second issue.

16. The apparatus of claim 9, wherein the processor is further configured to perform operations comprising:

predicting a second issue in a second online collaboration session based on parameters associated with the second online collaboration session and information associated with the labeled log of metrics; and applying corrective actions to prevent the second issue from occurring.

17. One or more non-transitory computer readable storage media encoded with instructions that, when executed by a processor, cause the processor to execute a method comprising:

detecting a phrase spoken in an online collaboration session between a plurality of users, the phrase being spoken by a first user to one or more second users, the phrase including a name of a user of the one or more second users;

determining that the phrase indicates an issue with a quality of user experience of the online collaboration session;

identifying, from a list that includes phrases, corresponding categories of issues, and corresponding attributes, a category of the issue and an attribute associated with the phrase, the attribute indicating that the name of the user is included in the phrase;

labeling a log of metrics associated with the online collaboration session with a time stamp corresponding to a time when the phrase was spoken and at least one of an indication of the phrase that was spoken or the category of the issue associated with the phrase that was spoken, to provide a labeled log of metrics that indicates a set of metric values associated with the online collaboration session at the time when the phrase was spoken;

determining one or more actions to perform based on the category of the issue associated with the phrase and the name of the user;

performing the one or more actions to improve the user experience based on detecting the phrase, the one or more actions including transmitting the phrase or the category of the issue to an online collaboration session application associated with the user; and training a machine learning system using the labeled log of metrics to identify or predict degraded user experiences associated with subsequent online collaboration sessions.

18. The one or more non-transitory computer readable storage media of claim 17, wherein detecting the phrase comprises detecting the phrase using automatic speech recognition (ASR).

19. The one or more non-transitory computer readable storage media of claim 17, wherein performing the one or more actions further comprises:

displaying corrective actions to be taken on a display of one of the plurality of users.

20. The one or more non-transitory computer readable storage media of claim 17, wherein performing the one or more actions further comprises:

adjusting parameters associated with the online collaboration session.

* * * * *